United States Patent
Szyszka et al.

(10) Patent No.: US 8,844,911 B2
(45) Date of Patent: Sep. 30, 2014

(54) AIR SPRING

(75) Inventors: Axel Szyszka, Hannover (DE); Matthias Hlawatczek, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 2338 days.

(21) Appl. No.: 11/664,499

(22) PCT Filed: Sep. 27, 2005

(86) PCT No.: PCT/EP2005/010393
§ 371 (c)(1),
(2), (4) Date: Apr. 3, 2007

(87) PCT Pub. No.: WO2006/042618
PCT Pub. Date: Apr. 27, 2006

(65) Prior Publication Data
US 2007/0257409 A1    Nov. 8, 2007

(30) Foreign Application Priority Data

Oct. 15, 2004 (DE) .................. 10 2004 050 189

(51) Int. Cl.
*F16F 9/04* (2006.01)

(52) U.S. Cl.
USPC .................................................. 267/64.27

(58) Field of Classification Search
USPC .......... 267/64.11, 64.16, 64.19, 64.21, 64.23, 267/64.24, 64.27
See application file for complete search history.

(56) References Cited

U.S. PATENT DOCUMENTS

| | | | | |
|---|---|---|---|---|
| 3,038,717 A | * | 6/1962 | Bank | 267/64.24 |
| 3,043,582 A | * | 7/1962 | Hirtreiter | 267/64.24 |
| 3,549,142 A | * | 12/1970 | Tilton | 267/64.24 |
| 3,897,941 A | * | 8/1975 | Hirtreiter et al. | 267/64.24 |
| 4,489,474 A | * | 12/1984 | Brown et al. | 29/508 |
| 5,253,850 A | * | 10/1993 | Burkley et al. | 267/64.24 |
| 5,382,006 A | | 1/1995 | Arnold | |
| 5,580,033 A | * | 12/1996 | Burkley et al. | 267/64.27 |
| 6,168,143 B1 | | 1/2001 | Lambrecht et al. | |

FOREIGN PATENT DOCUMENTS

| | | |
|---|---|---|
| DE | 11 75 038 | 7/1964 |
| FR | 2 717 237 | 9/1995 |
| GB | 873 348 | 7/1961 |

* cited by examiner

*Primary Examiner* — Xuan Lan Nguyen
(74) *Attorney, Agent, or Firm* — Walter Ottesen P.A.

(57) ABSTRACT

The invention relates to an air spring having an air spring flexible member (1) whose wall (5) of elastomeric material has at least one reinforcement layer (19) and bead (3) with a reinforcement core. The reinforcement layer surrounds the reinforcement core in the form of a loop (20). The flexible member wall, which projects from the bead, does not lie flush on the piston but forms an arc projecting away from the piston when viewed in cross section. The core loop can thus terminate inside the piston diameter thereby improving the roll-off characteristics of the flexible member.

8 Claims, 4 Drawing Sheets

AIR SPRING

RELATED APPLICATION

This application is the national stage of PCT/EP 2005/010393, filed Sept. 27, 2005, designating the United States and claiming priority from German patent application no. 10 2004 050 189.0, filed Oct. 15, 2004, the entire contents of which are incorporated herein by reference.

FIELD OF THE INVENTION

The invention relates to an air spring: having a roll-off piston with a piston cover, a roll-off edge, a roll-off surface and a conical seat in the piston cover; having an air spring flexible member with a flexible member wall of elastomeric material with at least one reinforcement layer and a bead, which is arranged at the lower end opening facing toward the roll-off piston, the bead having an annularly-shaped reinforcement core; with the at least one reinforcement layer being guided around the reinforcement core in the region of the lower end of the air spring flexible member.

BACKGROUND OF THE INVENTION

U.S. Pat. No. 6,168,143 describes such an air spring of the above-described type wherein the bead lies seal tight against the conical seat of the roll-off piston. The transition from the bead into the wall of the air spring flexible member is so configured that the air spring flexible member projects from the bead at an almost right angle to the piston axis and extends at the end of the bead facing toward the piston cover and lies against the piston cover. An annularly-shaped reinforcement core is worked into the bead and is, for example, a steel wire.

The flexible member wall of the air spring flexible member usually has one or several layers of a reinforcement fabric which takes up the loads occurring during operation. In order to be able to direct the forces into the roll-off piston, the reinforcement layers have to be wrapped around this reinforcement core. The reinforcement layers therefore form a loop the end of which must be guided back into the flexible member wall by a predetermined length to achieve the needed carrying capacity. This length cannot be made shorter as desired because of the maintenance of the necessary tensile strength of the reinforcement layer. In the region of the loop, the flexible member wall is especially stiff because of the doubled reinforcement layer.

The consequence of this arrangement is that the stiff region of the flexible member wall mostly extends beyond the roll-off edge (that is, the transition region from piston cover into the roll-off surface) and thereby makes more difficult the roll off of the air spring flexible member after a complete expansion of the entire air spring or, especially in the pressureless state, can even prevent the roll off. This causes the formation of folds in the air spring flexible member which can lead to a clamping and to a premature destruction of the flexible member wall.

SUMMARY OF THE INVENTION

The invention is therefore based on the task of providing an air spring of the kind described above which, even after complete expansion and also in the pressureless state, easily rolls off again on the roll-off piston. The invention is further based on the task to provide an air spring flexible member which is suitable for an air spring of this kind.

The task is solved in that: the flexible member of the air spring having a flexible member wall, which (in the state of the air spring flexible member mounted on the piston), at an upper end of the bead facing away from the piston cover projects from the bead and, for a complete expansion of the air spring, a tangent of the flexible member wall forms an angle with the cover of the roll-off piston in a range of 45° to 90° at the location at which the flexible member wall projects away from the bead and the loop of the at least one reinforcement layer ends ahead of the roll-off edge within the piston diameter in the deflected state of the air spring flexible member.

This invention affords the advantage that the flexible member wall does not lie on the piston cover when the air spring flexible member rolls off on the roll-off piston; instead, it forms an arc directed away from the cover. This arc takes up a longer length of the flexible member wall than a flexible member wall piece lying planar against the cover. For this reason, the back-guided loop of the reinforcement layer does not extend into the roll-off edge. The stiff part of the flexible member wall lies therefore still within the piston diameter so that the air spring flexible member can easily roll over the roll-off edge.

With this arrangement of the invention, the roll off performance of the air spring flexible member is improved in the pressure-charged state as well as in the pressureless state. In this way, an easier and more reliable deflection of the air spring is achieved in all operating states. The risk of damage of the air spring flexible member because of clamping and fold formation is reduced.

According to a further embodiment of the invention, the flexible member of the air spring has a desired bend in the region of the end of the loop in such a manner that the diameter of the air spring flexible member starting from this bend location increases to a greater extent over a predetermined length of the air spring flexible member than between the lower end of the air spring flexible member and the bend. This diameter increases upwardly from the lower end of the air spring flexible member in the unmounted perpendicularly aligned state. The bend comes to rest in the region of the roll-off edge of the roll-off piston in the operating state of the air spring.

The advantage of this arrangement is that, because of the bend, the air spring flexible member is preformed in the region of the roll-off edge in the roll-off direction and therefore facilitates additionally the roll off.

BRIEF DECRIPTION OF THE DRAWINGS

The invention will now be described with reference to the drawings wherein.

DESCRIPTION OF THE PREFERRED EMBODIMENTS OF THE INVENTION

Figure 1:
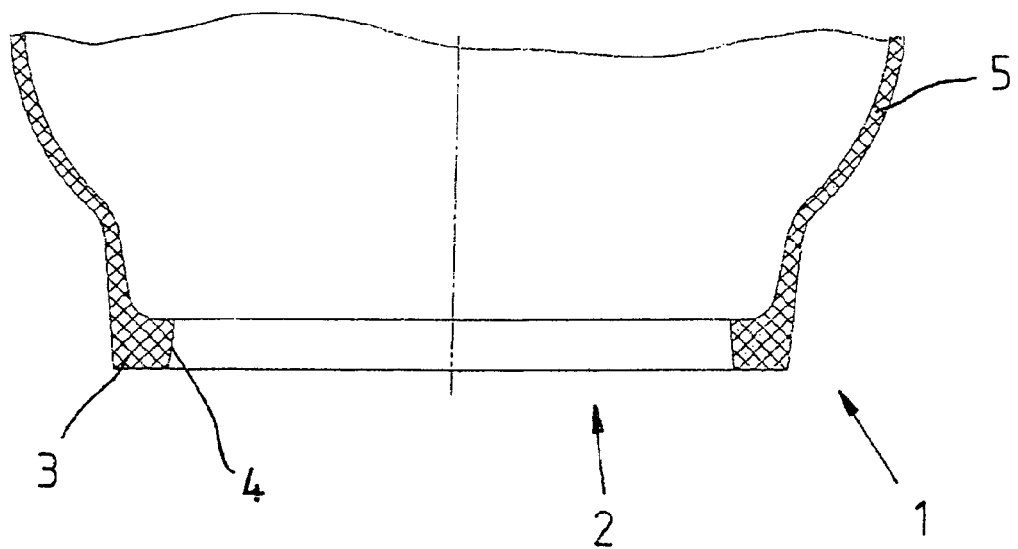
FIG. 1 is a lower section of an air spring flexible member in advance of assembly.

FIG. 1 shows a lower section of an unmounted air spring flexible member 1 according to the invention. The flexible member has a lower opening 2 which is surrounded by an annular bead 3 arranged around the opening 2. The bead 3 has a conical sealing surface 4 on its inner side. A flexible member wall 5 projects away from the bead 3.

Figure 2:
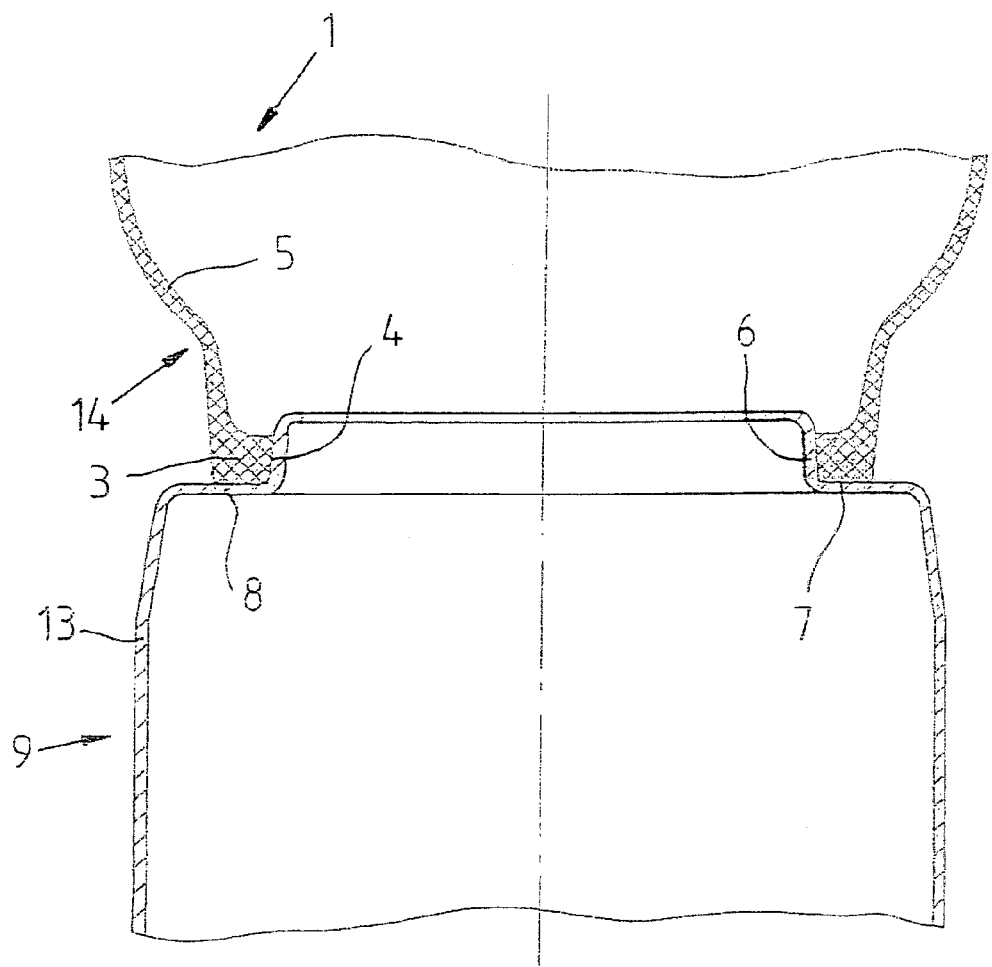
FIG. 2 shows the section of the air spring flexible member in the mounted, expanded state.

In FIG. 2, the section of the air spring flexible member 1 is shown in the mounted state and is completely expanded. The bead 3 lies with its conical sealing surface 4 on a conical seat 6 and lies on the piston cover 8 of a roll-off piston 9 with its lower end 7. Only an upper section of the roll-off piston 9 is shown. The conical seat 6 is arranged centrally in a piston cover 8. The piston cover 8 extends over a roll-off edge 12 into a roll-off surface 13. The roll-off piston is attached to a vehicle by an attachment device (not shown).

The flexible member wall 5 projects from the bead 3 at the upper end in such a manner that the flexible member wall forms an angle with the piston cover 8 which lies between 85° and 90°. The upper end is directed outwardly and faces away from the piston cover 8. The diameter of the air spring flexible member 1 increases continuously with increasing distance from the bead 3. The flexible member wall 5 has a desired bend 14 spaced from the bead 3. The increase in diameter of the air spring flexible member 1 increases over a specific length starting at this desired bend 14 so that the flexible member wall 5, viewed from the bead 3, arcs with greater intensity outwardly starting at the desired bend 14 than before the desired bend 14.

Figure 3:
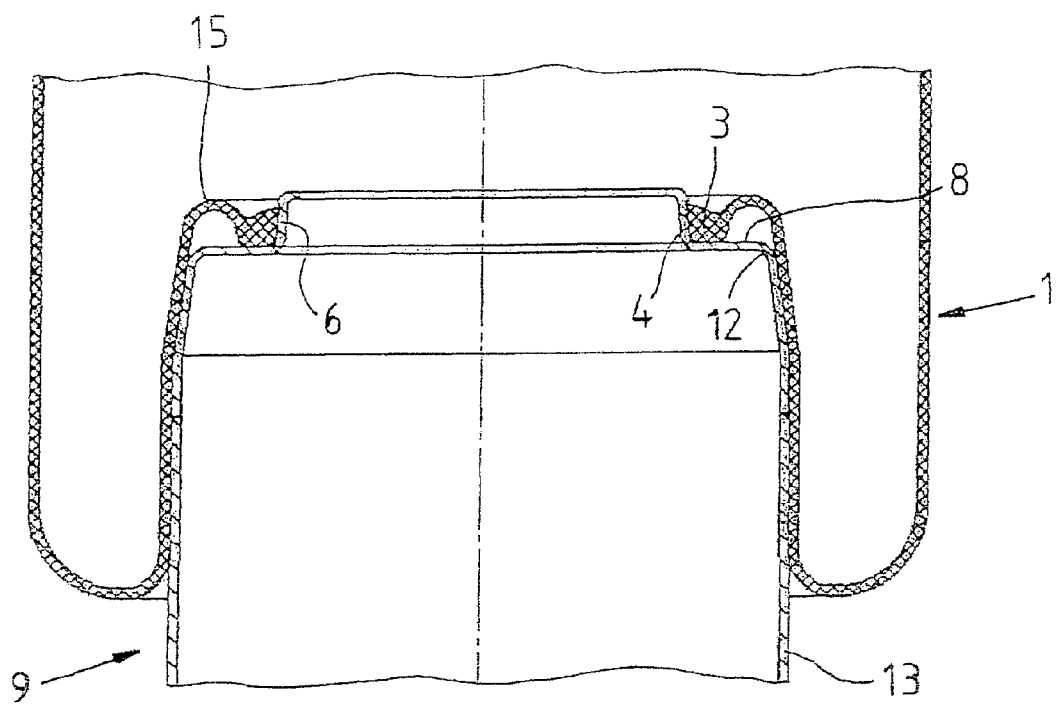
FIG. 3 is an air spring according to the invention having an air spring flexible member rolled off on a roll-off piston; and, FIG. 4 is a detail cross section of the bead region of the air spring flexible member of the invention.

FIG. 3 shows the lower section of the air spring flexible member 1 in the mounted and rolled-off state on a roll-off piston 9 of which only the upper portion is shown. The bead 3 of the air spring flexible member 1 is pressed onto the conical seat 6 with its conical inner surface 4 and closes the air spring flexible member 1 airtight against the roll-off piston 9.

The flexible member wall 5 projects outwardly upwardly from the bead 3 at an angle of 85° to 90°. The flexible member wall 5 is formed to an arc 15 by the roll off of the air spring flexible member 1 and this arc 15 essentially does not lie on the piston cover 8. The piece of the flexible member wall 5 in the arc 15 has a longer length than a piece of the flexible member wall 5 would have which projects horizontally from the bead 3 and lies planarly on the piston cover 8. This longer length is between bead 3 and the roll-off edge 12 of the roll-off piston 9.

Figure 4:
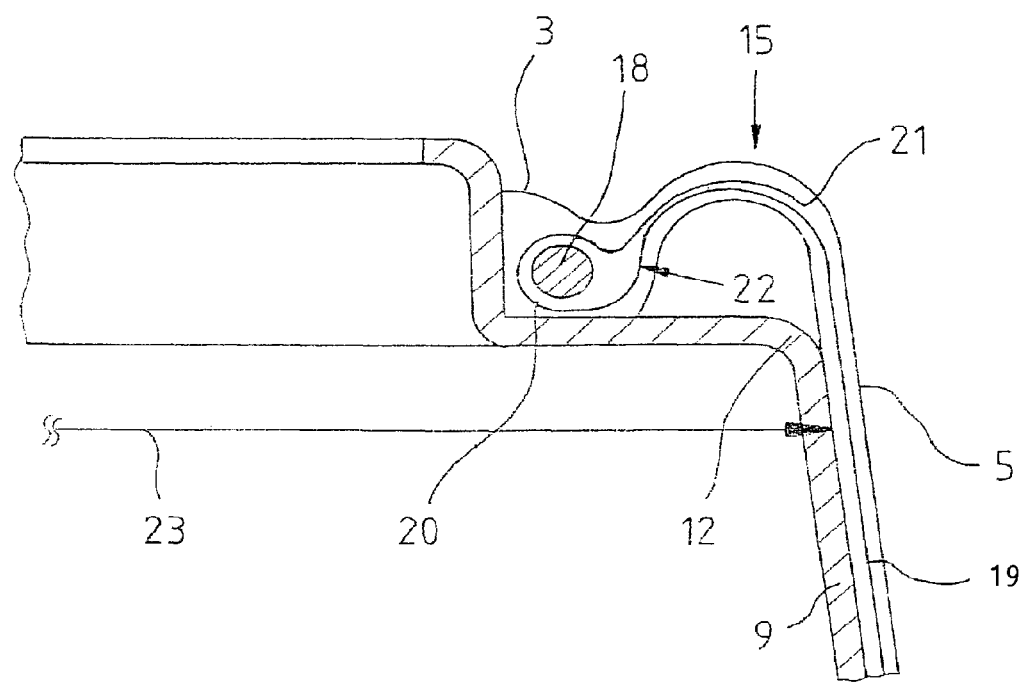

FIG. 4 shows a detail cross section of the bead region of the air spring flexible member 1 in the mounted state. An annularly-shaped reinforcement core 18 of steel wire is arranged in the interior of the bead 3. The flexible member wall 5 has a layer 19 of a reinforcement fabric which is wrapped around the reinforcement core 18 in the bead 3 and thereby forms a loop 20. The end 21 of the loop 20 is passed back into the flexible member wall 5 and ends before the flexible member wall 5 reaches the roll-off edge 12 of the roll-off piston.

In the arc 15, the flexible member wall 5 is especially stiff because of the doubled reinforcement layer 19. In a region 22 of the bead 3, the flexible member wall 5 is directed upwardly almost perpendicularly in the unmounted state. The flexible member wall 5 is compelled into the arc 15 by this stiffness during roll off of the flexible member wall 5 over the roll-off edge 12 of the roll-off piston 9. In this way, a longer length of the flexible member wall 5 can be accommodated still within the piston diameter 23. The end 21 of the loop 20 does not reach the roll-off edge 12.

The desired bend 14 (FIG. 1) is visible in the unmounted state of the air spring flexible member 1 and is pulled smooth by the forces, which occur during the roll off, and is no longer visible in FIG. 4. The desired bend 14 is so positioned in the flexible member wall 5 that it comes to lie shortly before or directly in the region of the roll-off edge 12 of the roll-off piston 9 and thereby additionally facilitates the rolling off of the air spring flexible member. This effect becomes especially significant when the air spring flexible member 1 is intended to roll off again on the roll-off piston 9 from the completely expanded state, that is, from the state directed completely upwardly and without inner pressure.

REFERENCE NUMERAL LIST (Part of the Description)
1 air spring flexible member
2 lower opening of the air spring flexible member 1
3 bead
4 conical sealing surface of the bead 3
5 flexible member wall
6 conical seat
7 lower surface of the bead 3
8 piston cover
9 roll-off piston
12 roll-off edge
13 roll-off surface
14 desired bend
15 arc of the flexible member wall 5
18 reinforcement core
19 reinforcement layer
20 loop
21 end of the loop 20
22 region of the transition from bead 3 in the flexible member wall 5
23 piston diameter

The invention claimed is:

1. An air spring comprising:
a roll-off piston having an end wall and an annular side wall extending from said end wall;
said annular side wall defining a diameter of said piston and defining a roll-off surface;
said annular side wall and said end wall conjointly defining a roll-off edge;
an air spring flexible member having a flexible member wall made of elastomeric material;
said flexible member wall having a lower end and a bead formed at said lower end to define a lower opening of said air spring flexible member facing toward said roll-off piston;
said end wall having a conical seat formed thereon for receiving said flexible member wall thereon at said bead so as to permit said flexible member wall to roll off on said roll-off surface during operation of said air spring;
said flexible member wall having a reinforcement layer and said bead having an annularly-shaped reinforcement core;
said reinforcement layer being formed to include a loop around said reinforcement core and said loop having an end ahead of said roll-off edge within said diameter of said piston so as to cause the flexible member wall to be less stiff beyond said roll-off edge than ahead of said roll-off edge when said air spring flexible member is in a deflected state whereby a more reliable deflection of said air spring is provided in all operating states; and,
said bead having an upper end facing away from said end wall and said flexible member wall extending from said upper end and, when said air spring flexible member is in a completely expanded state and also during operation, a tangent of said flexible member wall and said end wall conjointly defining an angle lying in a range of 45° to 90° at the location whereat said flexible member wall projects away from said bead.

2. The air spring of claim 1, wherein said flexible member wall has a desired bend in the region of said end of said loop in such a manner that the diameter of said flexible member wall increases more greatly starting from said desired bend over a predetermined length of said flexible member wall than between the lower end of said flexible member wall and said desired bend; said diameter of said flexible member wall increases when viewed upwardly from said lower end of said flexible member wall in the unmounted perpendicularly aligned state; and, said desired bend comes to rest in the region of said roll-off edge in the operating state of the air spring.

3. The air spring of claim 2, wherein said desired bend is concave when viewed from outside of said flexible member.

4. The air spring of claim 1, wherein said angle lies in a range of 85° to 90°.

5. An air spring flexible member for an air spring having a roll-off piston with a piston cover, a roll-off edge, a roll-off surface and a conical seat in the piston cover;
the air spring flexible member defining a longitudinal axis and comprising:
a flexible member wall made of elastomeric material and having a lower end;
said flexible member wall having a bead formed at said lower end defining a lower opening facing toward said roll-off piston;
said bead having an upper end and containing an annularly-shaped reinforcement core;
said flexible member wall having a reinforcement layer and said reinforcement layer being guided around said reinforcement core in the region of the lower end;
said flexible member wall projecting upwardly from said upper end of said bead when said air spring flexible member is aligned perpendicularly;
a tangent of said flexible member wall forming an angle with a plane lying perpendicularly to said longitudinal axis in a range of 45° to 90° at the location whereat said flexible member wall projects away from said bead for a complete expansion of the air spring and also during operation;
said loop of said reinforcement layer being guided back into said flexible member wall; and,
said loop ending ahead of the roll-off edge within the piston diameter in the deflected state of said air spring flexible member when said air spring flexible member is mounted on said roll-off piston.

6. The air spring flexible member of claim 5, wherein said flexible member wall has a desired bend in the region of said end of said loop in such a manner that the diameter of said flexible member wall increases more greatly starting from said desired bend over a predetermined length of said flexible member wall than between said lower end of said flexible member wall and said desired bend; said diameter of said flexible member wall increases when viewed upwardly from said lower end of said flexible member wall in the unmounted perpendicularly aligned state; and, said desired bend comes to rest in the region of the roll-off edge of the roll-off piston in the operating state of the air spring when said air spring flexible member is mounted on said roll-off piston.

7. The air spring flexible member of claim 6, wherein said desired bend is concave when viewed from outside of said flexible member wall.

8. The air spring flexible member of claim 5, wherein said angle lies in a range of 85° to 90°.

* * * * *